United States Patent

Nelson et al.

[11] Patent Number: 5,983,617
[45] Date of Patent: Nov. 16, 1999

[54] STRANDING MACHINE FOR USE IN THE MANUFACTURE OF FIBER OPTIC CABLES

[75] Inventors: Derwin A. Nelson; Warren W. McAlpine; Stephen O. Mast, all of Hickory, N.C.

[73] Assignee: Siecor Corporation, Hickory, N.C.

[21] Appl. No.: 09/002,158

[22] Filed: Dec. 31, 1997

[51] Int. Cl.[6] .................................................. D02G 3/36
[52] U.S. Cl. .............................. 57/3; 57/6; 57/13; 57/14; 57/58.86; 57/314; 242/439.5; 242/440
[58] Field of Search .................................. 57/3, 6, 13, 14, 57/15, 314, 58.86, 293; 242/150 R, 131, 439.5, 439.6, 440, 440.1

[56] References Cited

U.S. PATENT DOCUMENTS

| | | | |
|---|---|---|---|
| 3,827,225 | 8/1974 | Schoerner | 57/13 |
| 3,934,395 | 1/1976 | Vryland | 57/13 |
| 3,955,348 | 5/1976 | Orlandi | 57/13 |
| 3,969,880 | 7/1976 | Maillefer et al. | 57/6 |
| 4,002,011 | 1/1977 | Tanaka et al. | 57/15 |
| 4,015,415 | 4/1977 | Otsuki et al. | 57/34 R |
| 4,073,127 | 2/1978 | Orlandi et al. | 57/58.36 |
| 4,098,063 | 7/1978 | Varga | 57/13 |
| 4,253,298 | 3/1981 | Varga | 57/13 |
| 4,300,339 | 11/1981 | Orlandi et al. | 57/58.34 |
| 4,342,190 | 8/1982 | Ziemek et al. | 57/293 |
| 4,407,116 | 10/1983 | Henrich | 57/13 |
| 4,549,391 | 10/1985 | Toda et al. | 57/13 |
| 4,580,399 | 4/1986 | Henrich | 57/59 |
| 4,939,896 | 7/1990 | Blew | 57/293 |
| 5,060,467 | 10/1991 | Gill et al. | 57/13 |
| 5,263,309 | 11/1993 | Campbell et al. | 57/264 |
| 5,282,353 | 2/1994 | Kellstron, Jr. | 57/13 |
| 5,546,741 | 8/1996 | Karhu | 57/293 |

OTHER PUBLICATIONS

Product Brochure, 3KT SPR[c] Omaspiralwinder; O.M.A. High Tech System, Italy.

Primary Examiner—William Stryjewski
Attorney, Agent, or Firm—Timothy J. Aberle

[57] ABSTRACT

A machine for incorporating filament(s) into a fiber optic cable, e.g. a fly-off type strander (20). Strander (20) includes a frame (22) and a carriage (30) rotatably mounted to the frame. Carriage (30) includes filament packages (50) respectively mounted on fixed arbors (38) in protective barrels (33). For the prevention of snagging of the filaments on the packages, each barrel includes a respective filament guard (35) adjacent to or against which respective packages (50) are disposed. Each package (50) includes a respective filament tensioner (40) mounted to carriage (30) for tensioning a respective filament (52). As tensioners (40) are generally parallel to the axis of rotation of carriage (30), loosening or tightening of tensioner (40) during rotation of carriage (30) is avoided, whereby filaments (52) are firmly wrapped about a cable component at a controlled tension and an optimal speed.

17 Claims, 4 Drawing Sheets

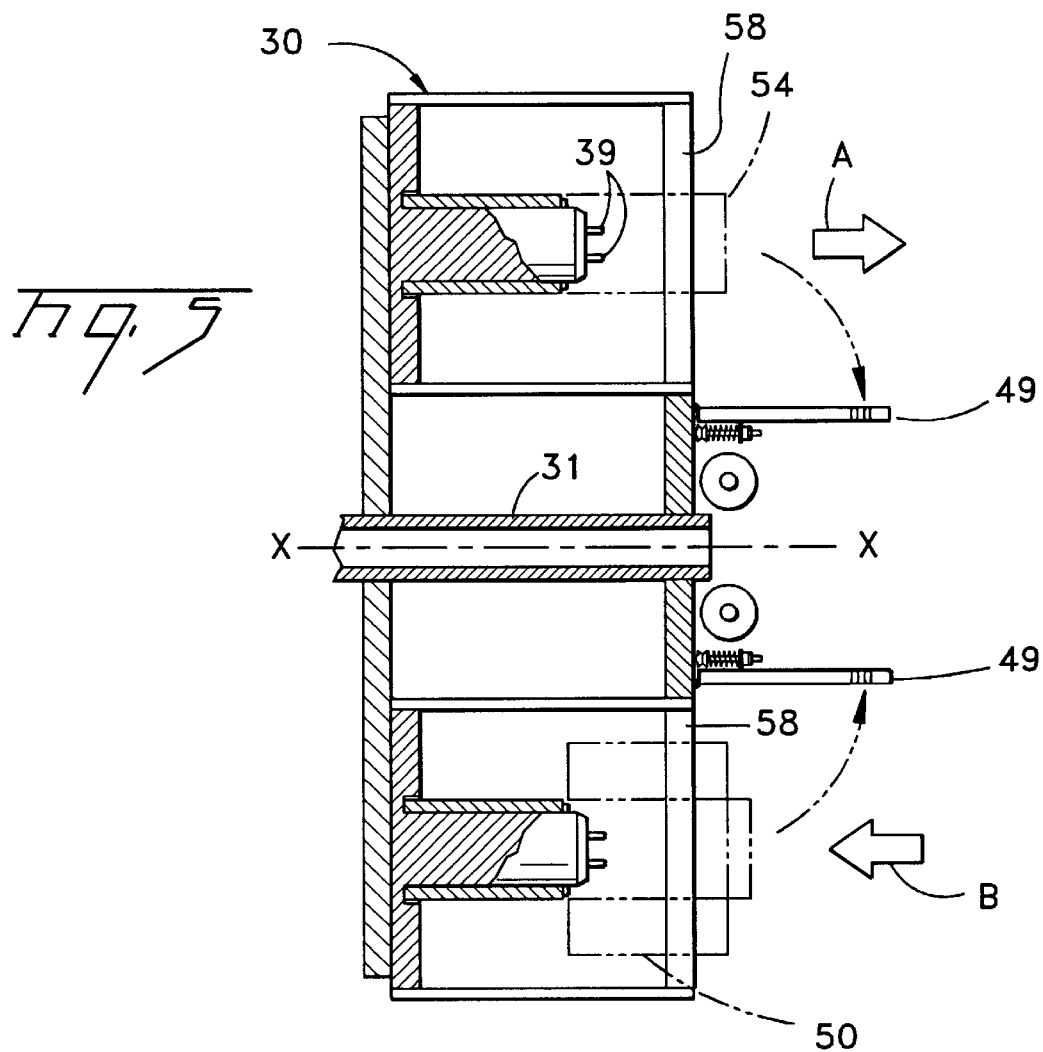
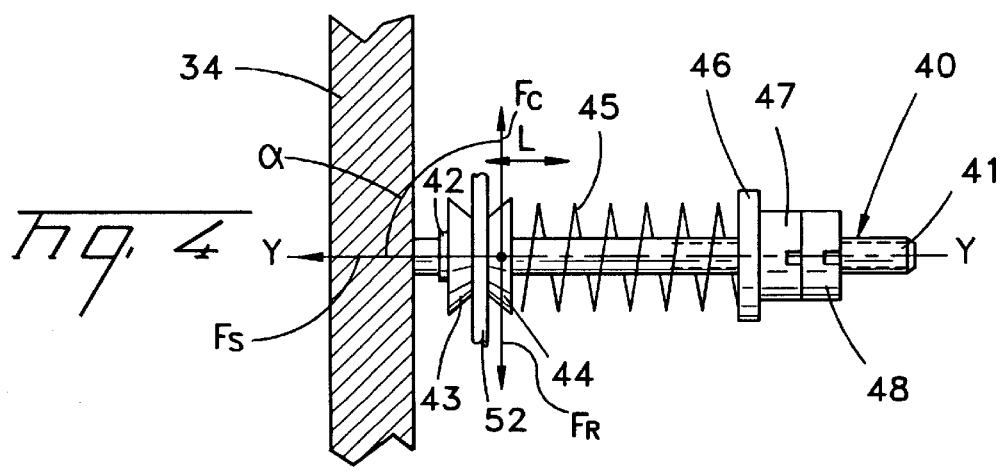

STRANDING MACHINE FOR USE IN THE MANUFACTURE OF FIBER OPTIC CABLES

The present invention relates to a machine for incorporating filament(s) into a fiber optic cable and, more particularly, to a fly-off type strander for use in the manufacture of fiber optic cables.

Fiber optic cables typically include a cable component which may have, for example, coated optical fibers stranded about a central strength member. To retain the coated optical fibers in place about the central strength member, one or more binding and/or strength filaments, e.g. yarns, may be helically stranded about the coated optical fibers. An apparatus which performs the filament stranding operation may be termed a strander.

A strander includes spools of wrapped yarns, which spools are commonly termed packages. Packages may be mounted to a rotating carriage of the strander, and may include yarns made of a high strength nylon or polyester material. The carriage may include a central tube which receives the cable component therethrough as the cable component moves along a cable production line. As the carriage rotates about its axis, centrifugal forces (forces which tend to move a mass away from the center of rotation) act on the masses which comprise the carriage. The axis of rotation of the carriage and the center of the central tube are generally aligned with the center of the production line. The yarns are attached to the cable component and, as the cable component moves along the cable production line, tension is created in the yarns. The tension in the yarns should be maintained within acceptable limits, as too much tension may break the yarn, and too little tension may result in an undesirably loose wrap of the yarns about the cable component. To make a helical wrap, the carriage (and necessarily the packages) are rotated about the core as the yarns are unwound from the package. In general, the faster the cable component traverses the production line the higher the speed of the carriage must be in order to achieve the desired helical pitch.

A strander may be classified according to the way by which it unwinds yarn, for example, a strander may be of the fly-off or spool-off type. A spool-off type strander unwinds the yarns by rotation of the packages to pay out the yarn. In a fly-off type strander, the packages are mounted to the carriage in a way that prevents relative rotation between the packages and the carriage, whereby the yarns are unwound from the packages by action of the tension in the yarn created by the moving cable component.

Spool-off type stranders have been conventionally used in the cable manufacturing industry but may exhibit some inherent limitations. For example, in a conventional spool-off type strander, a change in forces acting on a package may cause the yarn windings on the package to loosen. At high rotational speeds, a loosened yarn may cause the package to disintegrate, i.e., implode. Spool-off type stranders are therefore generally limited to a maximum rotational speed of about 300 RPM. Moreover, in order to unwind the yarn at the desired rate, some spool-off type stranders require relatively expensive drive mechanisms and control systems. Further, spool-off type stranders may create high tension in the yarn, e.g. over 300 grams, which may increase the likelihood of breakage or fraying of the yarn. Conventional spool-off stranders which experience the foregoing limitations are disclosed in U.S. Pat. No. 3,969,880, U.S. Pat. No. 3,934,395, and U.S. Pat. No. 5,060,467.

A fly-off type strander may be used as an alternative to the spool-off type. A known fly-off type strander is disclosed in U.S. Pat. No. 4,002,011 wherein a plurality of conically shaped packages are rigidly fixed to a rotatable carriage by respective mounting nuts, flanges, and screws. Each package has a yarn which may be about 15–25 Kilometers in length. The carriage is mounted to a central tube within which the cable component moves. The thread-up procedure, i.e., the installation of yarn on the strander between the package and the cable component, requires the operator to thread each yarn from its package through a hole in a package holder and through a guide ring, through first and second tensioners, then through two more guide rings, and lastly to the cable component. The first tensioner includes a spring which generates a biasing force. The biasing force acts on a moveable plate mounted to a threaded rod, whereby the moveable plate presses against the yarn.

During rotation of the carriage, as the yarn is drawn through the first tensioner, friction between the moveable plate and the yarn creates tension in the yarn. However, the first tensioner may loosen as a centrifugal force acting on the moveable plate forces the moveable plate away from the center of rotation and the yarn, thereby reducing friction and undesirably decreasing the tension in the yarn. This occurs because the angle between the respective directional components of the spring and centrifugal force is substantially zero. Consequently, the centrifugal force, the magnitude of which may be substantial, acts directly against the spring force, thereby reducing friction between the moveable plate and the yarn and reducing tension in the yarn. To compensate for the reduction in tension, the second tensioner creates tension in the yarn.

The known fly-off strander has several disadvantages, not the least of which is the use of two tensioners per yarn, which contributes to the capital outlay and maintenance expenses associated with the strander. Additionally, the thread-up path between the package and the cable component is substantially parallel to the axis of the production line, which is disadvantageous because the strander requires a substantial amount of valuable space along the production line. Thread-up of the known strander is complex as it requires ten points of contact per yarn, which may result in undesired twisting or fraying of the yarn. Further, as each guide ring is somewhat like the eye of a needle, the operators must expend a significant amount of time carefully inserting the yarn through each guide ring. Moreover, there exists a gap between the package and the carriage, and as the yarn is unwinding from the package, the yarn may become snagged therein and break. Further, the use of conically shaped packages is less than optimal, as the pay-out length of a yarn per spool is greater with cylindrically shaped packages. Additionally, each time it is desired to replace a spent package with a fresh one, the respective mounting nut must be unfastened and re-fastened, which negatively impacts the ease with which the packages are loaded and unloaded.

OBJECTS OF THE INVENTION

In view of the foregoing, it is an object of the present invention to provide a strander which is inexpensive and is easy for operators to use.

It is another object of the present invention to provide a strander which avoids snagging of the yarn.

It is a further object of the present invention to provide a strander which operates at high speeds without imploding packages mounted thereto.

BRIEF DESCRIPTION OF THE DRAWINGS

FIG. 4 is a side view of a tensioner mounted on the strander of FIG. 2.

FIG. 5 is a partial cross section of the strander of FIG. 2 depicting loading/unloading of packages.

DETAILED DESCRIPTION OF THE INVENTION

Figure 1:
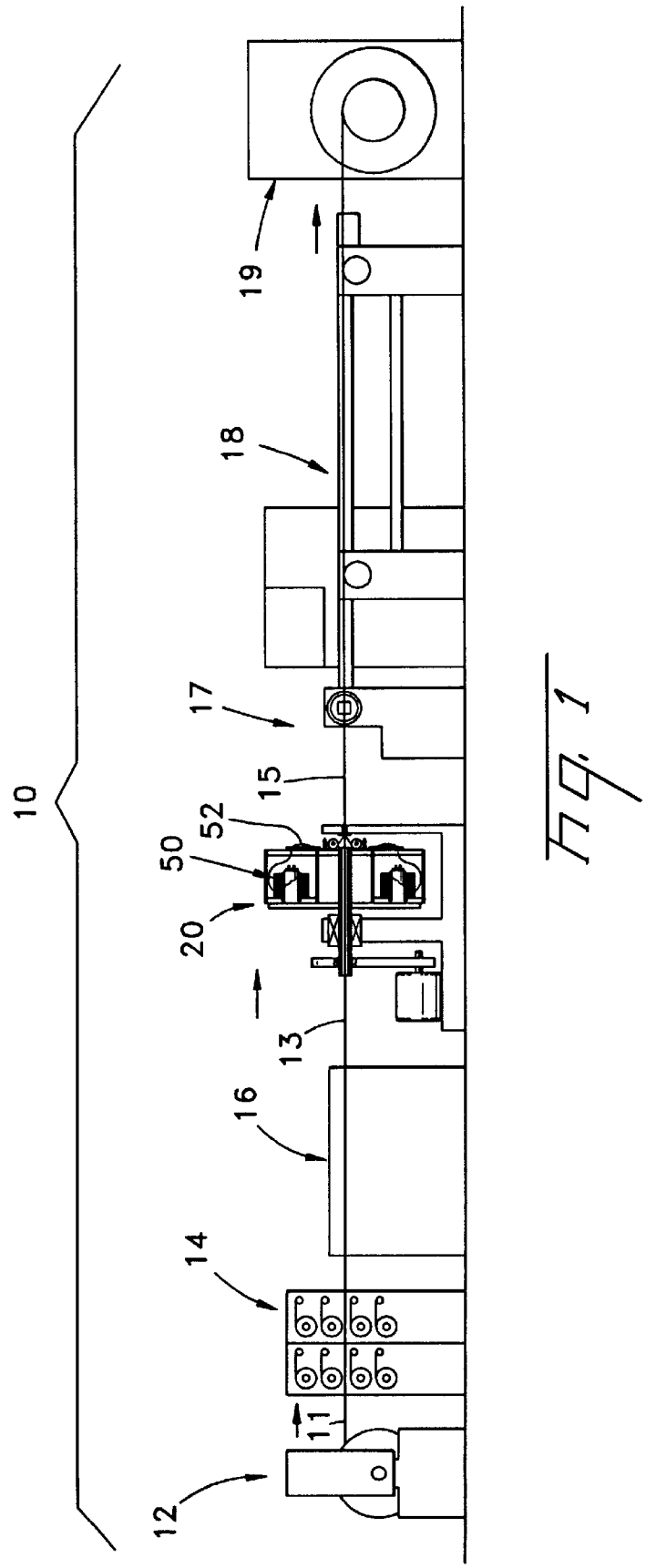
FIG. 1 is a schematic view of a fiber optic cable production line including a strander according to the present invention.

Referring to FIG. 1, an exemplary production line 10 including a machine for incorporating filament(s) into a fiber optic cable according to the present invention will be described. Production line 10 comprises a generally central production line axis X—X and includes a central member pay-off 12, a coated optical fiber pay-off station 14, an SZ oscillator 16, a strander 20, an extruder 17, a cooling trough 18, and a take-up reel 19. In operation, central member pay-off 12 may supply a dielectric type central member 11 to optical fiber pay-off station 14. The coated optical fibers are sent to SZ oscillator 16 where they are SZ stranded about central member 11 to form a cable component 13. Next, a machine for incorporating filaments into a fiber optic cable, e.g. a strander 20 including packages 50, helically strands filaments, for example yarns 52, about component 13 thereby creating a cable core 15. Cable core 15 passes through extruder 17 wherein a plastic jacket is extruded about core 15 to form a fiber optic cable. The fiber optic cable is cooled in cooling trough 18, and is then wound about a take-up reel 19.

Figure 2:
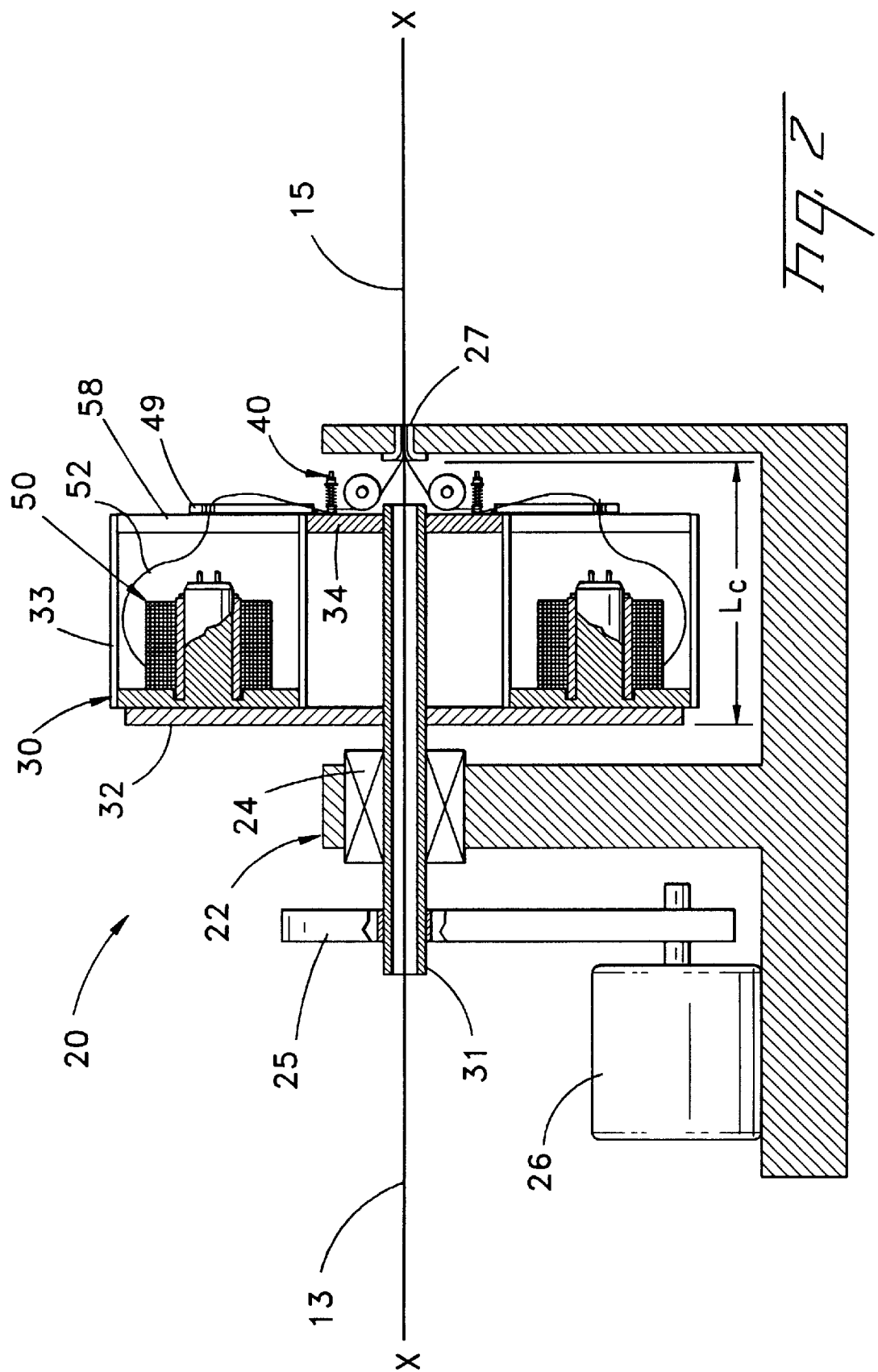
FIG. 2 is cross sectional view of the strander according to the present invention.

Referring to FIG. 2, strander 20 according to the present invention will be further described. Strander 20 includes a frame 22 with journal bearings 24 which rotatably support a carriage 30. A motor 26 is mounted to frame 22 and is operatively connected to carriage 30 by a timing belt 25. Frame 22 also includes a stranding guide 27 for guiding yarns around component 13.

Figure 3:
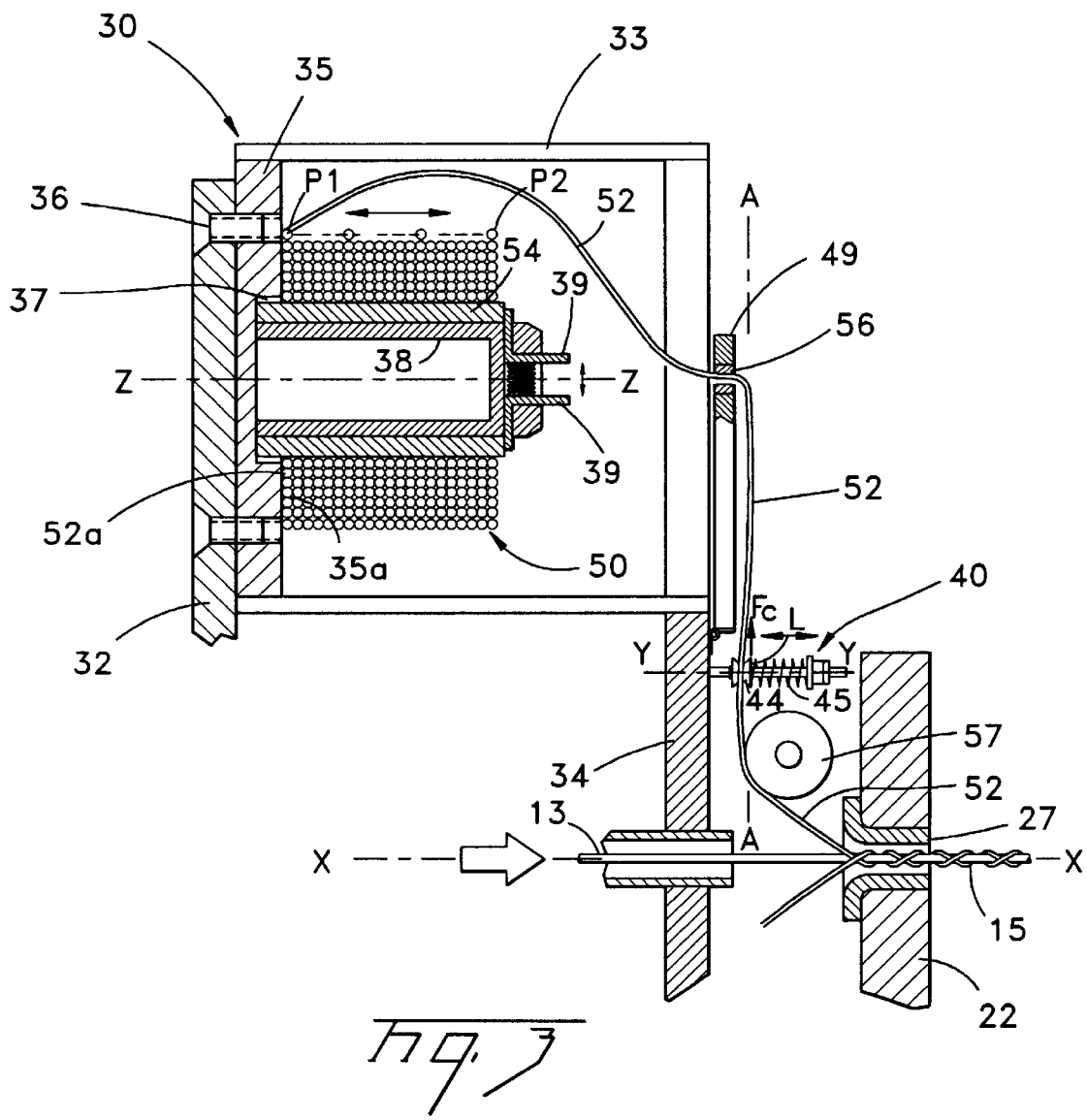
FIG. 3 is an enlarged view of a portion of the strander of FIG. 2.

Referring to FIGS. 2–3, carriage 30 includes a cable component receiving area, for example, a central tube 31 which receives cable component 13 therethrough. Carriage 30 is rotatably mounted to frame 22 by journal bearings 24. Carriage 30 is operatively connected to motor 26 by timing belt 25. A base 32 and a support 34 are fixed, e.g. welded, to a central tube 31. A protective barrel 33 is supported by and disposed between base 32 and support 34, which barrel 33 has a polished finish and provides a protective enclosure for a respective package 50. A yarn guard including a back-plate 35 having a face 35a is mounted to base 32 by fasteners 36. Back-plate 35 comprises a package receiving area comprising an annular recess 37 for receiving a package tube 54 of package 50. An arbor 38 having latches 39 is fixed, e.g. welded, to back-plate 35. Preferably, when package 50 is in a fully installed position in a respective barrel 33, latches 39 are snugly disposed against package tube 54, and a radial wall of package 50, for example a sidewall 52a, is substantially adjacent to or butts against face 35a of back plate 35 (FIG. 3).

Support 34 supports a tensioner 40 and a guide pulley 57. Guide pulley 57 may be part of an electronic tension meter system for monitoring tension in yarn 52. An arm 49 is connected to support 34 by a hinge which is lockable by, for example, the insertion of a locking pin (not shown). A yarn guide member, for example an eyelet 56, is mounted through an end section of arm 49 and is generally centered adjacent package 50 (FIGS. 2–4). Arm 49 partially covers a package access hole 58, which hole is sized to receive package 50 therethrough.

As best shown in FIGS. 3–4, tensioner 40 includes an axis Y—Y through a rod 41 having a stepped portion 42 and a stationary plate 43. Tensioner 40 includes a moveable yarn engaging section mounted to rod 41, for example, a moveable plate 44. Yarn 52 is threaded through a hole (not shown) in rod 41 between plates 43,44. Moveable plate 44 is biased by a biasing member 45, e.g. a coil spring, which is compressed between moveable plate 44 and an adjusting plate 46. To accommodate yarn 52, moveable plate 44 is moveable away from stationary plate 43. Moveable plate 44 comprises a line of action L generally along axis Y—Y (FIG. 4), and is pressed against yarn 52 along line of action L by a biasing force $F_s$ generated by biasing member 45. A nut 47 holds adjusting plate 46 in place, and a lock nut 48 prevents inadvertent movement of nut 47.

As no special tools are needed to remove or install package 50, strander 20 provides ease of use for an operator. When it is desired to set up strander 20 for operation, the operator may unlock the locking hinge of arm 49, and rotate arm 49 until it is clear of package access hole 58. If, for example, there is a spent package 50 in barrel 33, the operator may, without the need for a tool, depress latches 39 and remove package tube 54 from barrel 33 in the direction of arrow A (FIG. 5). The operator may then insert, in the direction of arrow B, a fresh package 50 into barrel 33.

The thread-up path of yarn 52 between package 50 and cable component 13 is advantageous because it is easy to set up and permits strander 20 to be of a compact design. In the thread-up procedure, an operator will thread a section of yarn 52 through eyelet 56, and close arm 49 and lock the hinge. Next, the operator will pull yarn 52 toward tensioner 40, push moveable plate 44 (along its line of action L) away from stationary plate 43, and thread yarn 52 through rod 41 and between plates 43,44. The operator will thread yarn 52 partially around guide pulley 57, and through stranding guide 27 and attach yarn 52 to cable component 13. A substantial portion of the thread-up path is between eyelet 56, tensioner 40, and pulley 57, which portion is generally along an axis A—A (FIG. 3). Each yarn 52 may advantageously have but three changes in yarn direction between package 50 and cable component 13, which reduces the likelihood of fraying/breakage of the yarn. Moreover, as a substantial portion of the thread-up path is perpendicular to the axis of rotation, strander 20 is compact and saves space along production line 10.

After the operator has attached the desired number of yarns to cable component 13, production line 10 is activated whereby cable component 13 begins to translate generally along axis X—X, and carriage 30, driven by motor 26, begins to rotate generally about axis X—X. Translation of cable component 13 causes tension in yarns 52 between cable component 13, tensioner 40, and package 50. Adjustment of the magnitude of spring force $F_s$ and the tension in yarn 52 is accomplished by loosening lock nut 48 and adjusting nut 47 towards or away from stationary plate 43. The magnitude of spring force Fs is inversely proportional to the distance between nut 47 and plate 43.

As carriage 30 rotates about axis X—X, yarns 52 will be flown-off respective packages 50. Package 50 is mounted to back-plate 35 such that there is an absence of a substantial gap therebetween thereby avoiding snagging of yarn 52. The position of departure of yarn 52 from package 50 varies in a rapid back-and-forth motion, e.g. between positions of departure P1 and P2 (FIG. 3). As noted above, package tube 54 fits into annular recess 37, which permits sidewall 52a to touch or to be substantially close to face 35a. This is advantageous because, as yarn 52 is being flown off package 50 at the P1 position, the absence of a substantial gap between sidewall 52a and face 35a prevents yarn 52 from becoming snagged by an edge of the package.

Protective barrel 33 provides a barrier against air, and preferably has a smooth finish which permits yarn 52 to slide thereagainst without becoming snagged or creating undue friction. Line of action L of moveable plate 44 is generally parallel to the axis of rotation X—X, whereby a centrifugal force $F_c$ (FIG. 3) acting on moveable plate 44 is generally transverse to axis Y—Y. An equal and opposite reaction force $F_R$ (FIG. 4) from rod 41 acts on moveable plate 44 whereby plate 44 is essentially held in a static condition.

In other words, rather than pressing against stationary plate 43, centrifugal force $F_c$ causes plate 44 to press against rod 41. Thus centrifugal force $F_c$ is directed away from line of action L and spring force $F_s$. Most preferably, axes X—X and Y—Y are substantially parallel, and a force balance angle α, defined between forces $F_c$ and $F_s$, is about 90 degrees. A force balance angle α of about 90 degrees is preferable as it results in essentially no centrifugal force $F_c$ directed against biasing force $F_s$ of spring 45. Since biasing force $F_s$ of spring 45 is not countered by force $F_c$, the pressure of moveable plate 44 on yarn 52, and the tension in the yarn, remains substantially unchanged during rotation of carriage 30.

Another advantage of the present invention is the fact that cylindrical packages 50 may include yarns having a long yarn length, e.g. 37 kilometers of aramid yarn. Moreover, since packages 50 are rigidly mounted to carriage 30 they are not, as in the case of spool-off type stranders, subject to additional forces of acceleration from being rotated about their own (Z—Z) axes. Therefore packages 50, according to the present invention, may be rotated at high RPMs, e.g. about 500 RPM or higher, without danger of imploding the packages. Also, the tension in the yarns may be maintained as low as 30 grams. Additionally, strander 20 eliminates the need for special packaging.

The present invention has thus been described with reference to the foregoing embodiment, which embodiment is intended to be illustrative of the inventive concepts rather than limiting. Skilled artisans will appreciate that variations and modifications of the foregoing embodiments may be made without departing from the scope of the appended claims. For example, although the invention has been described with reference to filaments of the aramid yarn type, other filament types may be used with the present invention, for example, loose or tight buffered optical fibers, fiberglass, polyester, nylon, water swellable yarns, binder tapes, etc. Although the invention has been described with reference to packages 50 which are unwound from the outside toward the center of the package, packages which are unwound from the inside out may be used as well, such packages are disclosed in U.S. Pat. No. 4,407,116, which is incorporated by reference in its entirety. Moreover, although the present invention has been described with reference to a force balance angle α of about 90 degrees, the present invention, depending on yarn tension requirements, may be practiced with an acute force balance angle, i.e., less than 90 degrees. Further, although the invention has been described with reference to a machine for incorporating filament(s) into a fiber optic cable, e.g. a strander, the concepts of the present invention may apply to other machines, e.g. a binding machine. Additionally, although the present invention has been described with reference to a package tube 54 of package 50 which extends outwardly of wall 52 and into a recess 37 in back-plate 35, the invention may be practiced with a package tube which is substantially flush with wall 52a and which does not extend into a recess in the back-plate. In this case, package 50 would remain substantially close to or touch back-plate 35 for preventing snagging of yarn 52, and a recess 37 may not be necessary.

Accordingly, what is claimed is:

1. A machine for incorporating filaments into a fiber optic cable, said machine comprising:
   a frame;
   a carriage rotatably mounted to said frame, said carriage having an axis of rotation located in a cable component receiving area of said carriage; and
   a tensioner for creating tension in at least one of said filaments, said tensioner mounted to said carriage and comprising
   a moveable filament engaging section operative to move along a line of action, said filament engaging section biased by a biasing force;
   as said carriage rotates about said axis, a centrifugal force is generated which acts on said filament engaging section, a force balance angle is defined between said centrifugal force and said biasing force, said centrifugal force being substantially directed away from said biasing force, whereby the tension applied to the filament by said tensioner remains substantially unchanged during rotation of said carriage.

2. The machine of claim 1, wherein said line of action is substantially parallel to said axis of rotation.

3. The machine of claim 1, wherein said force balance angle is about 90 degrees.

4. The machine of claim 1, wherein said filament engaging section comprises a moveable plate.

5. The machine of claim 1, wherein an axis of a package mounted to said carriage is parallel to said axis of rotation.

6. A machine for incorporating at least one filament into a fiber optic cable, said machine comprising:
   a frame; and
   a carriage rotatably mounted to said frame, said carriage comprising a filament guard and a package receiving area for receiving and supporting a package, said package being mounted to said carriage with the absence of a substantial gap between said package and said filament guard, said filament guard operative to prevent snagging of said filament as said filament is flown off of said package wherein said filament guard comprises a recess for accommodating a package tube of said package.

7. The machine of claim 6, wherein said filament guard comprises a back-plate.

8. The machine of claim 6, wherein a portion of said package touches said filament guard for avoiding snagging of said filament.

9. The machine of claim 6, wherein a portion of said package is substantially adjacent to said filament guard for avoiding snagging of said filament.

10. The machine of claim 6, wherein an axis of said package is parallel to said axis of rotation.

11. A machine for incorporating filaments into a fiber optic cable, said machine comprising:
   a frame; and
   a carriage mounted to said frame for rotation about an axis of rotation, said carriage comprising a base and a support which extend generally transverse to said axis of rotation, said carriage further comprising a barrel disposed between said base and support for receiving a package;
   a tensioner mounted on said support, said tensioner comprising a filament engaging section which is biased by a biasing force for creating tension in at least one of filaments; and a thread-up path for said filament, said thread-up path comprising a substantially perpendicularly directed portion which extends from a filament guide member adjacent said package through said tensioner toward said axis of rotation.

12. The machine of claim 11, wherein as said carriage rotates about said axis, a centrifugal force is generated which acts on said filament engaging section, a force balance angle defined between said centrifugal force and said biasing force, said centrifugal force being substantially directed away from said spring biasing force, whereby the tension applied to the filament by said tensioner remains substantially unchanged during rotation of carriage.

13. The machine of claim 11, wherein said base carriage comprises a filament guard, said package is mounted to said carriage with the absence of a substantial gap between said package and said filament guard, said filament guard operative to prevent snagging of said filament as said filament is flown off of said package.

14. The machine of claim 11, wherein an axis of said package is parallel to said axis of rotation.

15. The machine of claim 11, wherein said filament engaging section is operative along a line of action which is generally parallel to said axis of rotation.

16. The machine of claim 11, wherein said thread-up path consists essentially of said filament guide member, said tensioner, and a guide pulley.

17. In a method for winding a filament about a cable component, comprising the steps of:

rotating a carriage about an axis of rotation;

flying off a filament from a package which rotates about said axis of rotation but does not rotate relative to said carriage;

directing the filament towards the axis of rotation of the carriage;

tensioning the filament with a force directed generally parallel to the axis of rotation; and wrapping the filament about a fiber optical cable component which is generally aligned with said axis of rotation.

* * * * *